Nov. 24, 1964  C. SAURER  3,158,042
HYDRAULIC LOCKING DIFFERENTIAL
Filed July 31, 1961  3 Sheets-Sheet 1
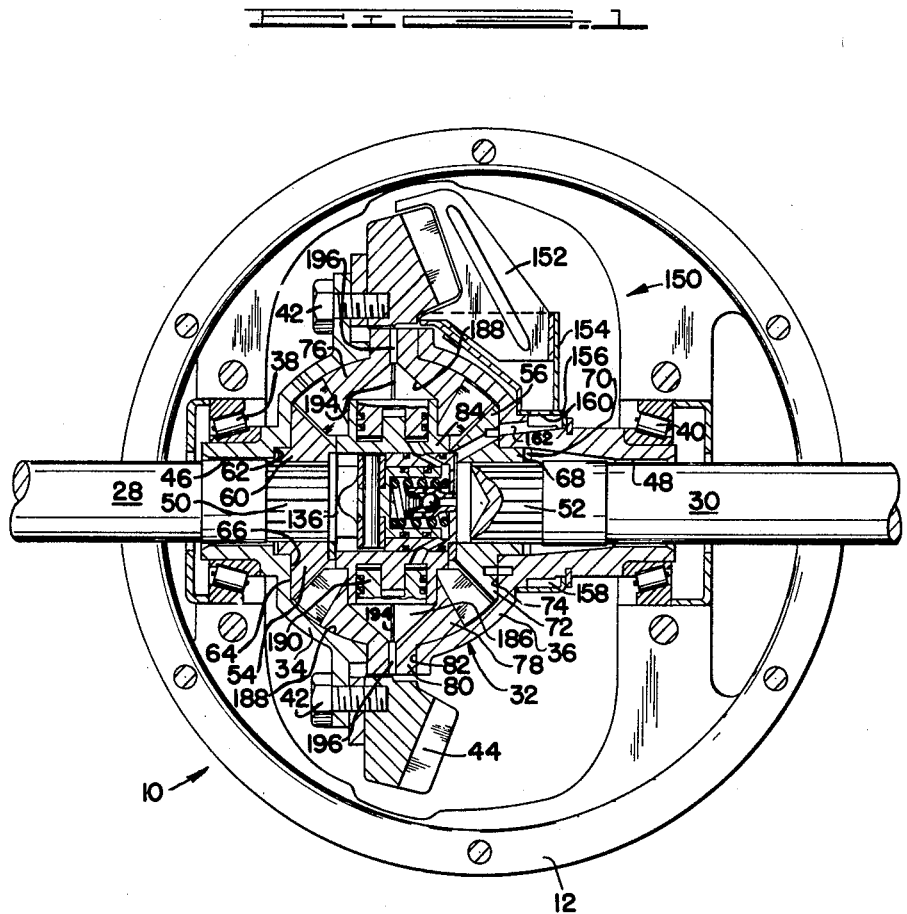
INVENTOR.
CURT SAURER
BY
OLSEN AND STEPHENSON
ATTORNEYS

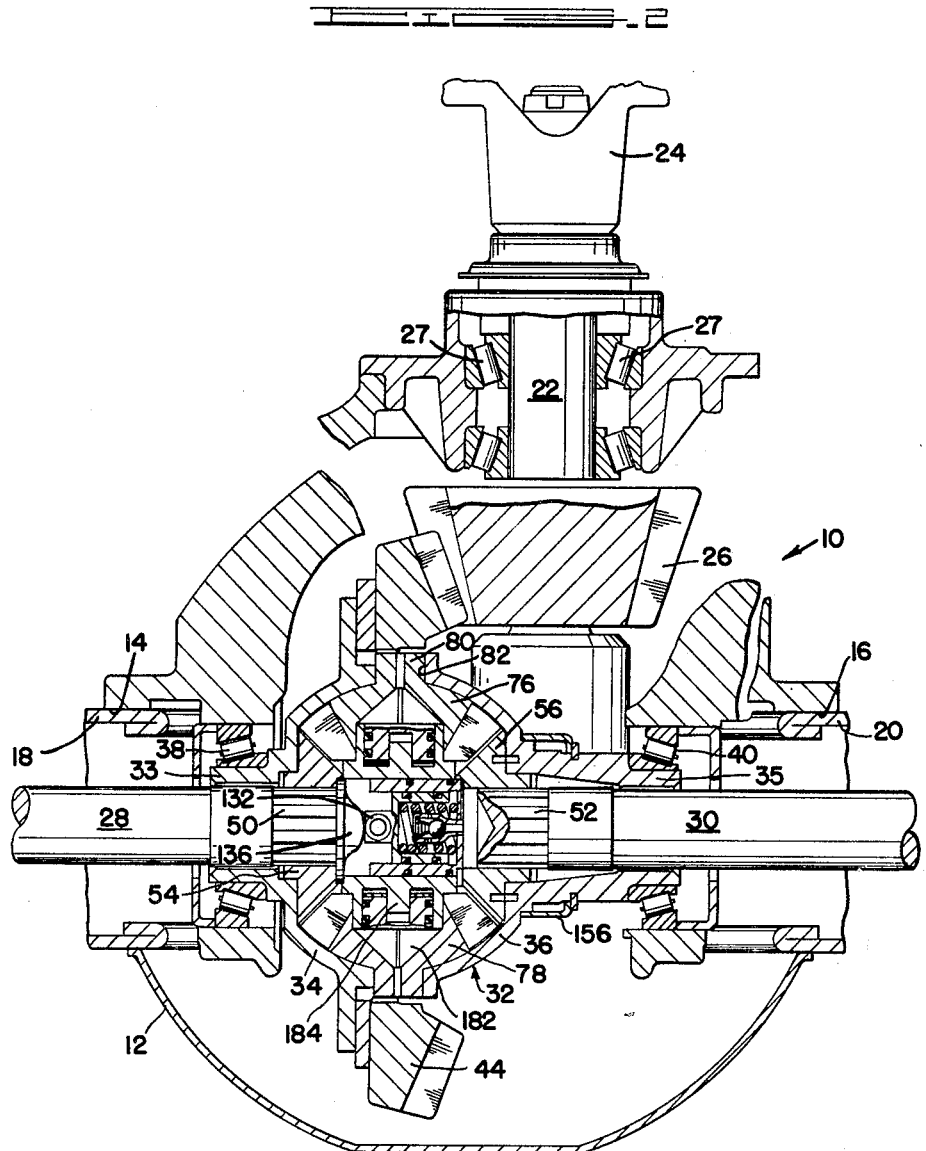

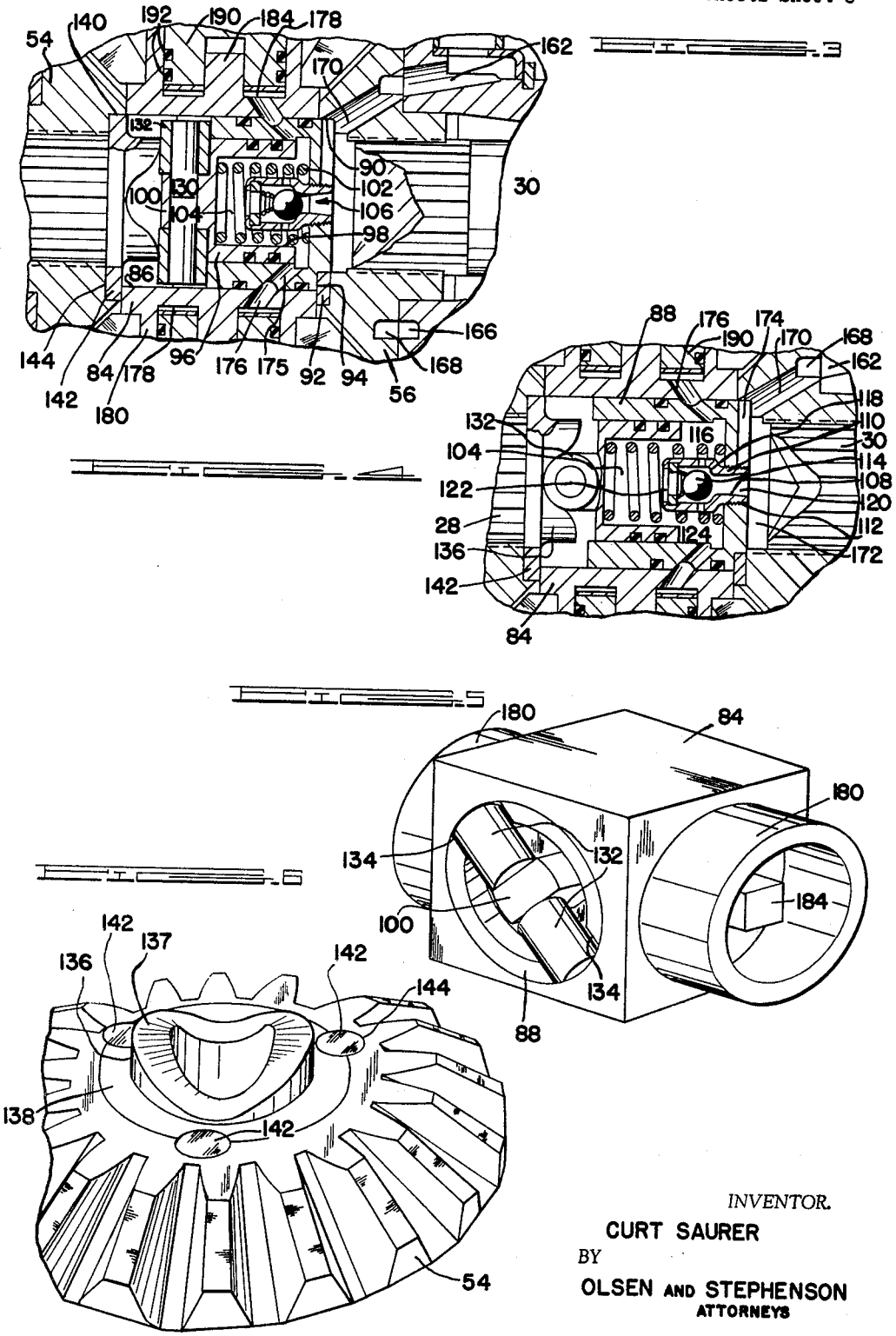

3,158,042
HYDRAULIC LOCKING DIFFERENTIAL
Curt Saurer, Oak Park, Mich., assignor to Thornton Products Company, Dearborn, Mich., a corporation of Michigan
Filed July 31, 1961, Ser. No. 128,226
13 Claims. (Cl. 74—711)

This invention relates generally to differential drives for vehicles and more particularly to a hydraulic locking differential which is an improvement on the hydraulic locking differential shown in my prior application, Serial No. 54,642, filed September 8, 1960, now Patent No. 3,109,323, issued November 5, 1963.

In the hydraulic locking differential shown in my prior application, differential action is provided between the two driving axle shafts and when one axle shaft begins to spin relative to the other axle shaft, the differential action is restricted. This is accomplished by providing a pump in the differential which operates in response to relative rotation of the axle shafts to supply fluid under pressure to a pair of pistons which are mounted so that in response to a supply of fluid under pressure they move the differential pinion gears into frictional engagement with the differential case. When the differential pinion gears are in frictional engagement with the case, relative rotation of the side gears which are disposed in the case and connected to the axle shafts is restricted so that the axle shafts are locked for concurrent rotation. It is an object of this invention to provide an improved hydraulic locking differential in which both the side gears and the pinion gears are moved into frictional engagement with the case in response to relative turning of the axle shafts so as to thereby increase the effectiveness of the frictional lock between the shafts and increase the total gear area which engages the case with a consequent reduction in the extent of wear of the gears.

A further object of this invention is to provide a hydraulic locking differential of the foregoing type in which the pump is actuated by a cam and follower assembly which is mounted in the differential separately from the axle shafts, so that the dimensions of the axle shafts do not affect the installation and operation of the differential mechanism.

Still a further object of this invention is to provide an improved hydraulic locking differential which is economical to manufacture and install, effective to provide the desired locking action of the axle shafts without adversely affecting the necessary differential action for turning corners and the like, and which is usable over a prolonged service life.

Further objects, features and advantages of this invention will become apparent from a consideration of the following description, the appended claims, and the accompanying drawing in which:

FIGURE 1 is a substantially vertical sectional view of the differential of this invention, showing the differential in assembly relation with the wheel driving axle shafts;

FIGURE 2 is a sectional view of the differential of this invention, the major portion of the view being a horizontal section through the axle shafts extending into the differential, and the remainder of the view being a fragmentary horizontal section immediately below the first-named horizontal section and passing through the axis of the driving pinion for the differential;

FIGURE 3 is an enlarged fragmentary sectional view of a portion of the structure shown in FIG. 1;

FIGURE 4 is a fragmentary sectional view, illustrated similarly to FIG. 3, of a portion of the differential mechanism of this invention, showing the cam and cam follower assembly in the differential in relatively moved positions from the positions shown in FIG. 3;

FIGURE 5 is a perspective view of the spider member in the differential of this invention showing the pump mounted therein; and FIGURE 6 is an exploded perspective view of the cam and the side gear in which it is mounted in the improved differential of this invention.

With reference to the drawing, the hydraulic locking differential of this invention, indicated generally at 10, is illustrated in FIGS. 1 and 2 as including a differential housing 12 provided with a pair of substantially aligned openings 14 and 16 in which a pair of axle housings 18 and 20, respectively, are secured. As shown in FIG. 2, an input drive shaft 22 extends into the forward end of the differential housing 12 and has a universal joint yoke 24 at its forward end. A bevel pinion 26, positioned within the differential housing 12, is secured on the rear end of the drive shaft 22 which is supported on bearings 27 carried by the housing 12.

A pair of wheel driving shafts 28 and 30 are disposed axially within the axle housings 18 and 20, respectively, and project into the interior of the differential housing 12. A differential case 32, formed in two halves 34 and 36, has oppositely extending axial tubular portions 33 and 35 which are rotatably supported in the housing 12 on roller bearings 38 and 40 so that the case 32 is rotatable about the inner ends of the coaxial axle shafts 28 and 30. The two halves 34 and 36 of the differential case 32 are secured together by bolts 42 which also secure a ring gear 44 to the case 32. The ring gear 44 extends about the case 32 at a position between the case supporting bearings 38 and 40 and is positioned in meshing engagement with the pinion gear 26. As a result, rotation of pinion gear 26 effects rotation of the ring gear 44 and the case 32 about the axis of the wheel driving shafts 28 and 30.

The differential tubular portions 33 and 35 form axially aligned openings 46 and 48 in the case 32 through which the axle shafts 28 and 30, respectively, project into the gear case 32. The inner end of the axle shaft 28 is provided with a splined section 50 and the inner end of the shaft 30 is similarly provided with a splined section 52. The differential 10 includes the usual side gears 54 and 56 which are splined on the axle spline sections 50 and 52, respectively, so that the side gears 54 and 56 rotate with their respective shafts 28 and 30. The side gear 54 is provided with a central hub section 60 which projects outwardly into an annular cavity 62 formed in the gear case half 34 at a position surrounding the opening 46. The side gear 54 also includes an annular outer side surface 64 which surrounds the hub section 60 and is of a shape complementary to the shape of the adjacent side surface 66 of the case 32 so that the side gear surface 64 will fit against the side surface 66 formed on the interior of the gear case half 34. The cavity 62 is of a depth such that the side gear surface 64 engages the gear case surface 66 prior to bottoming of the hub section 60 in the cavity 62. The surfaces 64 and 66 are relatively large so that when they are in engagement the case surface 66 exerts a substantial frictional force on the gear surface 64.

The side gear 56 is likewise formed with an outwardly projecting annular hub section 68 which projects into a cavity 70 formed in the gear case half 36. The side gear 56 has an annular rear side surface 72 which surrounds the hub section 68 and is of a shape complementary to the shape of an annular surface 74 formed on the gear case half 36 at a position surrounding the cavity 70. The surfaces 72 and 74 are of a sufficiently large area to provide for the application of a relatively large frictional force to the rear side of the gear 56 when it is moved against the gear case surface 74.

Also positioned within the differential case 32 are a pair of differential pinion gears 76 and 78, each of which is positioned in meshing engagement with the side gears 54 and 56. The pinion gears 54 and 56 are mounted so that they are arranged in a coaxial relation and have hub portions 80 which are journaled in openings 82 in the gear case 32 so that the pinion gears 76 and 78 can rotate freely on their common axis. By virtue of their support on the gear case 32, the pinion gears 76 and 78 rotate with the case 32 when it is rotated by the pinion 26.

A spider or body member 84 is mounted in the gear case 32 at a position between the inner ends of the axle shafts 28 and 30. The spider member 84 supports the inner sides of the pinion gears 76 and 78 and has an axial bore 86 which is aligned with the axle shafts 28 and 30. A pump cylinder 88 is mounted within the bore 86 so that it is open to the inner end of the axle shaft 28 and substantially closed to the inner end of the wheel driving axle shaft 30. The substantially closed end of the cylinder 88 fits in an axial cavity 90 formed in the inner side of the side gear 56 and is secured to the side gear 56 by a plurality of locking pins 92, only one of which is shown, each of which is fitted in an opening 94 formed by mating half openings formed in the cylinder 88 and the side gear 56. Thus, the pump cylinder 88 is secured to the inner side of the side gear 56 so that it rotates with the side gear 56 which in turn rotates with the wheel driving axle shaft 30.

Arranged within the pump cylinder 88 in a pump piston 96 which is formed in its working face with a cavity 98 and on its opposite face with an axial projection 100. A spring 102 positioned in the cavity 98 engages the closed end of the cylinder 88 and the working face of the piston 96 so as to continually urge the piston 96 to the left as shown in FIGS. 1, 2 and 3. The cavity 98 and the space between the closed end of the cylinder 88 and the working face of the piston 96 constitutes a pump chamber 104 in which a check valve assembly 106 is positioned. The assembly 106 includes a housing 108 having a threaded tubular projection 110 which is mounted in a threaded opening 112 in the closed end of the cylinder 88. A ball 114 in the housing 108 is urged by a small spring 116 into engagement with a seat 118 so as to close the passage 120 through the tubular projection 110. An opening 122 in the inner end of the housing 108 communicates with the chamber 104 and a plurality of openings 124 in the side of the housing 108 likewise communicate with the chamber 104.

A shaft 130 extends transversely through and is rotatably supported on the piston projection 100. Tubular follower members 132 are mounted on opposite ends of the shaft 130 and project into slots 134 formed in transversely opposite sides of the cylinder 88. As a result of the arrangement of the followers 132 within the slots 134, the pump piston 96 can reciprocate in the pump cylinder 88 but is prevented from rotating relative to the cylinder 88. Consequently, the pump piston 96 must rotate with wheel driving axle shaft 30 but is free to reciprocate relative to the shaft 30. The followers 132 engage diametrically opposite sides of a circular cam member 136 (FIG. 6) which is arranged in a coaxial relation with the pump piston 96 and has a cam face 137 which slopes in a direction axially of the cam member 136.

The cam member 136 has an annular axially outwardly extending hub section 138 which fits within an axial cavity 140 formed on the inner side of the side gear 54. A plurality of locking pins 142 lock the flange 138 to the side gear 54 so that the cam member 136 must rotate with the side gear 54. Each of the pins 142 fits within an opening 144 formed by mating half openings provided in the side gear 54 and the cam member flange 142. The compression spring 102 continuously urges the followers 132 against the face 137 so that differential action between the wheel driving axle shafts 28 and 30 effects travel of the cam followers 132 on the circular cam 136 thereby producing reciprocating action of the pump piston 96 which is shown in its extreme inner and outer positions in FIGS. 3 and 4, respectively. The fluid under pressure in the pump chamber 104 is utilized to move the differential gears 76, 78, 54 and 56 into frictional engagement with the gear case 32 to restrict the differential action between the shafts 28 and 30 in a manner to be hereinafter described.

The source of fluid for the pump is supplied by a lubricating oil gravity feed assembly, indicated generally at 150 in FIG. 1, and described in detail in my prior application Serial No. 113,870 filed May 31, 1961. The assembly 150 includes an upright stationary collecting plate 152 which is positioned in the gear housing 12 so that it intercepts the lubricating oil which is clinging to and traveling with the ring gear 44. This oil flows downwardly on the interceptor plate 152 into a funnel 154 which is mounted on an annular ring 156 which encircles a portion of the gear case 32 so as to form an annular chamber 158 between the ring 156 and the gear case 32. Oil collected in the funnel member 154 flows out of the funnel member 154 through an opening 160 into the chamber 158 from which it flows through a plurality of inclined passages 162 (only one of which is shown) in the gear case 32. At their inner ends, the passages 162 communicate with an annular cavity 166 in the inner wall of the gear case half 36, and the cavity 166 is aligned with a similar annular cavity 168 in the outer side of the side gear 56. The cavity 168 communicates with the outer ends of a plurality of radially inwardly inclined passages 170 (only one of which is shown) in the side gear 56. The closed end of the cylinder 88 is spaced from the inner end of the axle shaft 30 so as to form a chamber 172 therebetween which communicates with the inlet passage 120 for the check valve assembly 106. The chamber 172 also communicates with the inner ends of the passages 170 and the cylinder 88 may also be formed with a plurality of radially extending grooves 174 to provide a further communication between the passages 170 and the chamber 172.

As a result of the gravity feed assembly 150, a supply of lubricating oil is continually provided for the chamber 172 and a small head of lubricating oil will be maintained constantly at the inlet for the check valve assembly 106 by the lubricating oil in the funnel member 154. When the piston 96 moves to the left as viewed in FIG. 1, oil is sucked from the chamber 172 past the ball valve 114 (FIG. 4) into the pump chamber 104 and when the piston 96 is subsequently moved to the right as viewed in FIG. 1, the ball 114 is moved onto its seat 118 (FIG. 3) and the fluid in the chamber 104 is expelled through communicating passages 175 and 176 in the cylinder 88 and the spider member 84, respectively, into radially outwardly extending cavities 178 formed in the radially extending tubular legs 180 of the spider member 84. The cavities 178 define piston chambers which are open at their outer ends and a pair of locking piston 182 are mounted in the chambers 178 for reciprocal movement. Each piston 182 is guidably mounted on a rectangular projection 184 formed on the spider member 84 so that it projects into the chamber 178. Each of the locking pistons 182 has a cylindrical portion 190 and an enlarged radially outer end portion 186 which is generally conical in shape and overlies the ends of the spider legs 180. The piston end portions 186 fit into complementary conical surfaces 188 formed in the inner sides of the pinion gears 76 and 78. The cylindrical portion 190 of each piston 182 fits loosely in the cavity 178 and is provided with piston rings 192 which have sufficient clearance between the cavity walls to permit the leakage of some fluid from the chamber 178 into grooves 194 formed in the conical portion 186 so that they communicate with an axial passage 196 in each of the pinion gears 76 and 78. The grooves 194 provide a source of lubricating oil for the pinion gears 76 and 78 and also provide for a leakage of fluid from the chambers 178 for a purpose to appear presently.

Whenever differential action takes place between wheel driving axle shafts 28 and 30 causing pump piston 96 to reciprocate, lubricating oil will be discharged from the pump chamber 104 to the piston chambers 178. Fluid under pressure in the chambers 178 urges the locking pistons 182 outwardly of the spider legs 180 so that the conical portions 186 of the locking pistons will be urged against the complementary surfaces 188 of the pinion gears 76 and 78, thereby urging the pinion gears 76 and 78 into frictional engagement with the inner surface of the differential case 32. The locking pistons 182 are mounted so that the enlarged conical end portions 186 thereof will engage the outer ends of the spider legs 180 prior to bottoming of the pistons in the cylinder chambers 178. This arrangement insures the chambers 178 being continuously open to the passages 176 in the spider. Also, the fluid under pressure in the pump chamber 104 urges the pump piston 96 and cylinder 88 in opposite directions. In other words, the fluid in the chamber 104 urges the piston 96 toward the left as viewed in FIG. 1 so that the followers 132, the cam 136 and the side gear 54 are also urged toward the left so that the side gear surface 64 is urged into frictional engagement with the complementary shaped inner surface portion 66 of the differential gear case 32. Likewise, since the cylinder 88 is engaged with the inner side of the side gear 56, the side gear 56 is urged toward the right in FIG. 1 so that its outer surface 72 is moved into frictional engagement with the inner surface portion 74 of the gear case 32. When the differential gears 54, 56, 76 and 78 are in frictional engagement with the inner surface of the gear case 32, differential action between the wheel driving axle shafts 28 and 30 is restricted or completely prevented. When sufficient pumping action has occurred to provide for a substantial fluid pressure in the chamber 104, the differential gears 54, 56, 76 and 78 are held against relative rotation so that the shafts 28 and 30 are effectively locked against relative rotation.

The lubricating oil pumped into the chambers 178 flows at restricted rates or leaks past the pistons 182 through the grooves 194 and the passages 196 back into the lubricating oil reservoir formed in the differential housing 12. By virtue of this arrangement of the locking pistons 182 so that the actuating fluid therefor can leak past the pistons, when the differential action between the wheel driving axle shafts 28 and 30 is relatively slight, such as occurs when the vehicle is being turned traveling around a corner or a curve in a road, the necessary differential action between the shafts 28 and 30 will not be substantially restricted. This will necessarily occur so long as the rate of displacement of the lubricating oil in the pump cylinder 88 resulting from reciprocation of the pump piston 96 does not exceed the rate at which lubricating oil pumped into the chambers 178 can leak past the locking pistons 182.

The locking action which takes place between the differential gears 54, 56, 76 and 78 and the gear case 32 becomes progressively greater as the relative rotation between the wheel shafts 28 and 30 becomes greater so that differential action substantially ceases when one of the shafts 28 and 30 begins to spin freely relative to the other, as would occur if the vehicle were stationary and one wheel is on ice or packed snow. Under these circumstances, the differential action would stop almost instantaneously by the locking action of the side gears 54 and 56 so that driving torque would be transmitted evenly through the differential into both shafts 28 and 30. The amount of leakage of lubricating oil permitted around the locking pistons 182 determines in advance the allowable differential action that can occur between the shafts 28 and 30 before the locking action occurs, since the amount of this leakage determines the fluid pressures that will be developed in the pump chamber 104. The mounting of the pistons 182 on the non-circular projections 184 eliminates any turning of the pistons 182 in the chambers 178. As a result, the danger that the piston rings 192 will wear sufficiently to affect the leakage rate is substantially eliminated. As greater differential action occurs, progressively greater locking action is obtained. As a result the undesirable differential action which occurs when one shaft 28 or 30 spins freely relative to the other shaft is substantially eliminated, without undue wear of any of the differential gears as a result of their frictional engagement with the gear case 32, since both the pinion gears and the side gears are being moved into frictional engagement with the gear case. Furthermore, this is accomplished without adversely effecting the desired differential action which takes place when the vehicle turns corners and the like.

From the above description it is seen that this invention provides a hydraulic locking differential in which the desired locking of the driving shafts 28 and 30 is obtained in response to what is determined to be excessive differential action between the shafts 28 and 30, without relying on any particular dimensions for the shafts 28 and 30 or requiring any modifications or additions to the shafts 28 and 30. Since the pump cylinder 88, piston 96, followers 132 and cam 136 are mounted entirely independently of the shafts 28 and 30 and are not dependent on their position on any particular position of the shafts 28 and 30, the desired pump action is obtained irrespective of dimensional variations of the shafts 28 and 30. This feature of this invention is important because in parts as large as the shafts 28 and 30, the dimensions may vary considerably among the shafts in a large group available for assembly with the differential mechanism 10. The locking of the differential gears to the gear case 32 to obtain a locking of the shafts 28 and 30 is obtained by moving both the pinion gears and the side gears into frictional engagement with the gear case 32. Such movement of the gears into frictional engagement with the gear case necessarily involves some wear of the outer surfaces of the gears which frictionally engage the gear case. Since all of the gears in this invention engage the gear case, this wear of the gears is not only evenly distributed in both sets of gears, but the frictional forces between the gears and the gear case are reduced because of the maximum areas involved. Consequently, the differential 10 of this invention is usable over a prolonged service life.

It will be understood that the hydraulic locking differential which is herein disclosed and described is presented for purposes of explanation and illustration and is not intended to indicate limits of the invention, the scope of which is defined by the following claims.

What is claimed is:

1. In combination, a differential housing adapted to contain lubricating oil and having oppositely disposed openings therein adapted to be closed by axle shaft housings, coaxial wheel driving shafts extending into said housing through said openings, a differential drive mechanism disposed within said housing and including a drive pinion, a differential case rotatably mounted on the axis of said shafts and carrying a ring gear coaxially disposed around its outer periphery and in mesh with said drive pinion, differential side gears positioned within said case and mounted on said wheel driving shafts for rotation therewith and for axial outward movement into frictional engagement with said case to restrict relative rotation of said case and the side gears, a spider coaxially arranged within said case for rotation therewith and having its legs extending radially outwardly, differential pinion gears rotatably mounted on the legs of said spider and in mesh with said side gears, said differential pinion gears being movable outwardly on their axes for effecting frictional engagement with the inner wall of said case and thereby to restrict free rotation of the differential pinion gears relative to the case, said legs of the spider having piston chambers therein opening to the outer ends thereof, pistons in said chambers adapted when urged outwardly to move said differential pinion gears into effective frictional engagement with said case, the hub of said spider defining a pump chamber therein, passageways communicating between said pump chamber and the inner ends of said piston chambers, other passageways communicating between said pump chamber and the lubricating oil-containing portion of said housing, means in said housing operable to supply oil to said pump chamber, and pump means within said pump chamber, said pump means including a pair of members which are reciprocally movable relative to each other and are mounted in engagement with said side gears for imparting axial thrust thereto, said pump means being responsive to relative turning of said driving shafts to move said reciprocally movable members in opposite directions so as to urge said side gears into frictional engagement with said case and to supply lubricating oil under pressure to said piston chambers to move said pistons for restricting turning of said differential pinion gears relative to said case to thereby restrict relative turning of said driving shafts with respect to one another.

2. In combination, a differential housing, coaxial wheel driving shafts extending into said housing, a differential drive mechanism disposed within said housing and including a differential case rotatably mounted on the axis of said shafts, a set of differential side gears positioned within said case and mounted on said wheel driving shafts for rotation therewith and for limited axial movement thereon, a set of differential pinion gears in mesh with said set of differential side gears and mounted for turning with said case, said sets of gears being movable outwardly on their axes for effecting frictional engagement with the inner wall of said case and thereby restricting free rotation of the side gears relative to the case, and means in said case responsive to relative turning of said driving shafts to engage and urge said sets of gears axially outwardly into clamped engagement between said inner wall and said means.

3. In combination, a differential housing adapted to contain lubricating oil and having oppositely disposed openings therein, coaxial wheel driving shafts extending into said housing through said openings, a differential drive mechanism disposed in said housing and including a drive pinion, a differential case rotatably mounted on the axis of said shafts and carrying a ring rear in mesh with said drive pinion, differential side gears positioned within said case and mounted on said wheel driving shafts for rotation therewith, differential pinion gears in mesh with said side gears and mounted for turning with said case, said side and differential pinion gears being movable outwardly on their axes for effecting frictional engagement with the inner wall of said case and thereby restricting free differential rotation of the side and differential pinion gears relative to the case, piston means associated with said differential pinion gears and operable in response to action of lubricating oil under pressure to engage and urge said differential pinion gears outwardly into clamped engagement between said piston means and said case, by-pass means associated with said piston means permitting limited passage of said oil past said piston means so as to control the effective oil pressure acting on said piston means, and pump means responsive to relative rotation of said driving shafts for pumping lubricating oil under pressure to said piston means, said pump means operably engaging said side gears and responsive to said relative rotation for imparting axial thrust to said side gears for moving said side gears into frictional engagement with said case.

4. In combination, a differential housing adapted to contain lubricating oil and having oppositely disposed openings therein, coaxial wheel driving shafts extending into said housing through said openings, a differential drive mechanism disposed in said housing and including a drive pinion, a differential case rotatably mounted on the axis of said shafts and carrying a ring gear in mesh with said drive pinion, differential side gears positioned within said case and mounted on said wheel driving shafts for rotation therewith, differential pinion gears in mesh with said side gears and mounted for turning with said case, said side and differential pinion gears being movable outwardly on their axes for effecting frictional engagement with the inner wall of said case and thereby restricting free differential rotation of the side and differential pinion gears relative to the case, piston means associated with said differential pinion gears and operable in response to action of lubricating oil under pressure to urge said differential pinion gears outwardly, and pump means responsive to relative rotation of said driving shafts for pumping lubricating oil under pressure to said piston means, said pump means comprising a circular cam mounted on the inner end of one of said side gears, means defining a pump cylinder having a closed end in axial thrusting engagement with the inner side of the other side gear, a reciprocable piston in said cylinder, follower means attached to said reciprocable piston and adapted to ride on said cam, spring means urging said follower means against said circular cam so that when relative rotation occurs between said shafts said reciprocable piston will reciprocate, means for supplying lubricating oil to said pump cylinder, and a passageway providing communication between said pump cylinder and said piston means so that when said reciprocable piston reciprocates lubricating oil under pressure will be pumped to said piston means.

5. In combination, a differential housing adapted to contain lubricating oil, coaxial wheel driving shafts extending into said housing from opposite sides thereof, a differential drive mechanism disposed within said housing and including a differential case rotatably mounted on the axis of said shafts, differential side gears positioned within said case for limited axial movement and mounted on said wheel driving shafts for rotation therewith, differential pinion gears rotatably mounted in said case in mesh with said side gears and having outer surfaces adapted to be urged outwardly into frictional engagement with the inner wall of said case, pistons mounted adjacent to said differential pinion gears to urge the differential pinion gears against said case, pump means within said case responsive to relative turning of said driving shafts to provide lubricating oil under pressure which is effective to urge said pistons and thereby said pinion gears outwardly, said pump means including members which are urged in opposite directions by said lubricating oil under pressure, said pump members being positioned in axial thrusting engagement with the inner sides of said differential side gears for urging said side gears outwardly into frictional engagement with said case.

6. A fluid locking differential comprising a differential case, a differential pinion gear rotatably disposed in said case, side gears operatively meshed with said differential pinion gear and adapted to be connected to wheel driving shafts, at least one of said side gears being movable outwardly on its axis for effecting frictional engagement with the inner wall of said case and thereby to restrict free rotation of the side gear relative to the case, pump means mounted in said case between said side gears and responsive to relative turning of shafts connected to said side gears for pumping a fluid under pressure through said case, said pump means including relatively movable members which are urged in opposite directions by said fluid under pressure, said members extending between said side gears with one of said members mounted for thrusting engagement of the axially inner side of said one side gear and movable in response to said fluid under pressure to urge said one side gear axially outwardly to effect clamping engagement of said one side gear between said one member and said case.

7. A fluid locking differential is claimed in claim 6 wherein both said side gears are movable axially outwardly on their axes for effecting frictional engagement with the inner wall of said case, and both of said members are mounted for movement in response to said fluid under pressure to effect clamping engagement of both said side gears respectively between said members and said case.

8. A fluid locking differential as claimed in claim 6 wherein said pump means is constructed and arranged to progressively increase the restriction of relative movement between said side gear and the case when the pressure of the fluid supplied by the pump means is progressively increased.

9. In a fluid locking vehicle differential mechanism which includes a housing adapted to contain lubricating fluid, coaxial wheel driving shafts extending into said housing, a differential drive mechanism disposed within said housing and including a differential case rotatably mounted on the axis of said shafts, a pair of spaced differential side gears positioned in said case and mounted on said wheel driving shafts for rotation therewith and for movement axially outwardly on said shafts into frictional engagement with said case, a differential pinion gear in mesh with said side gears and mounted for turning with said case, said pinion gear being movable axially outwardly into frictional engagement with said case, means in said case operable in response to a supply of fluid under pressure thereto to move said pinion gear outwardly, pump means in said case operable in response to relative rotation of said shafts to supply fluid under pressure to said pinion gear moving means, said pump means comprising a cylinder having one end sealed to the inner side of one of said side gears, a piston reciprocally mounted in said cylinder for movement toward said one end to expel fluid under pressure from said cylinder, an annular cam member secured to said other one of said side gears and projected toward said piston, and follower means carried by said piston and engaged with said cam so that on relative rotation of said cam and follower means said piston is reciprocated in said cylinder whereby on movement of said piston to expel fluid from said cylinder the fluid under pressure in said cylinder effects an application of oppositely directed forces to said side gears which move said side gears into frictional engagement with said case.

10. In a fluid locking vehicle differential mechanism which includes a housing adapted to contain lubricating fluid, coaxial wheel driving shafts extending into said housing, a differential drive mechanism disposed within said housing and including a differential case rotatably mounted on the axis of said shafts, a pair of spaced differential side gears positioned in said case and mounted on said wheel driving shafts for rotation therewith and for movement axially outwardly on said shafts into frictional engagement with said case, a differential pinion gear in mesh with said side gears and mounted for turning with said case, said pinion gear being movable axially outwardly into frictional engagement with said case, means in said case operable in response to a supply of fluid under pressure thereto to move said pinion gear outwardly, pump means in said case operable in response to relative rotation of said shafts to supply fluid under pressure to said pinion gear moving means, said pump means comprising a cylinder having one end seated against the inner side of one of said side gears for imparting axial thrust thereto, a piston reciprocally mounted in said cylinder for movement toward said one end to expel fluid under pressure from said cylinder, an annular cam member secured to said other one of said side gears and projected toward said piston, follower means carried by said piston and engaged with said cam so that on relative rotation of said cam and follower means said piston is reciprocated in said cylinder whereby on movement of said piston to expel fluid from said cylinder the fluid under pressure in said cylinder effects an application of oppositely directed forces to said side gears which move said side gears into frictional engagement with said case, and means continually urging said piston in a direction to maintain said follower means in engagement with said cam member.

11. In a fluid locking vehicle differential mechanism which includes a housing adapted to contain lubricating fluid, coaxial wheel driving shafts extending into said housing, a differential drive mechanism disposed within said housing and including a differential case rotatably mounted on the axis of said shafts, a pair of spaced differential side gears positioned in said case and mounted on said wheel driving shafts for rotation therewith and for movement axially outwardly on said shafts into frictional engagement with said case, a differential pinion gear in mesh with said side gears and mounted for turning with said case, said pinion gear being movable axially outwardly into frictional engagement with said case, means in said case operable in response to a supply of fluid under pressure thereto to move said pinion gear outwardly, pump means in said case operable in response to relative rotation of said shafts to supply fluid under pressure to said pinion gear moving means, said pump means comprising a cylinder having one end sealed against the inner side of one of said side gears for imparting axial thrust thereto, means in said housing communicating with said cylinder for supplying fluid to said cylinder, a piston reciprocally mounted in said cylinder for movement toward said one end to expel fluid under pressure from said cylinder, an annular cam member secured to said other one of said side gears and projected toward said piston, and follower means carried by said piston and engaged with said cam so that on relative rotation of said cam and follower means said piston is reciprocated in said cylinder whereby on movement of said piston to expel fluid from said cylinder the fluid under pressure in said cylinder effects an application of oppositely directed forces to said side gears which move said side gears into frictional engagement with said case.

12. In a fluid locking vehicle differential mechanism which includes a housing adapted to contain lubricating fluid, coaxial wheel driving shafts extending into said housing, a differential drive mechanism disposed within said housing and including a differential case rotatably mounted on the axis of said shafts, a pair of spaced differential side gears positioned in said case and mounted on said wheel driving shafts for rotation therewith and for movement axially outwardly on said shafts into frictional engagement with said case, a differential pinion gear in mesh with said side gears and mounted for turning with said case, said pinion gear being movable axially outwardly into frictional engagement with said case, means in said case operable in response to a supply of fluid under pressure thereto to move said pinion gear outwardly, pump means in said case operable in response to relative rotation of said shafts to supply fluid under pressure to said pinion gear moving means, said pump means comprising a cylinder having one end engaged with the inner side of one of said side gears, means including a fluid supply passage extending through said one side gear for conveying lubricating fluid from said housing to said cylinder, a piston reciprocally mounted in said cylinder for movement toward said one end to expel fluid under pressure from said cylinder, an annular cam member secured to said other one of said side gears and projected toward said piston, follower means carried by said piston and engaged with said cam so that on relative rotation of said cam and follower means said piston is reciprocated in said cylinder whereby on movement of said piston to expel fluid from said cylinder the fluid under pressure in said cylinder effects an application of oppositely directed forces to said side gears which move said side gears into frictional engagement with said case, and spring means in said cylinder continually urging said piston in a direction to maintain said follower means in engagement with said cam member.

13. In a fluid locking vehicle differential mechanism which includes a housing adapted to contain lubricating fluid, coaxial wheel driving shafts extending into said housing, a differential drive mechanism disposed within said housing and including a differential case rotatably mounted on the axis of said shafts, a pair of spaced differential side gears positioned in said case and mounted on said wheel driving shafts for rotation therewith and for movement axially outwardly on said shafts into frictional engagement with said case, each of said side gears having an outer side which is of a shape complementary to the shape of the adjacent portion of said case with which said side gear is frictionally engageable, differential pinion gears in mesh with said side gears and mounted for turning with said case, said pinion gears being movable axially outwardly into frictional engagement with said case, means in said case operable in response to a supply of fluid under pressure thereto to move said pinion gears outwardly, pump means in said case operable in response to relative rotation of said shafts to supply fluid under pressure to said pinion gear moving means, said pump means comprising a cylinder secured to the inner side of one of said side gears, a piston reciprocally mounted in said cylinder for forcing fluid under pressure from said cylinder, an annular cam member secured to the inner side of said other one of said side gears and projected toward said piston, and follower means carried by said piston and engaged with said cam so that on relative rotation of said cam and follower means said piston is reciprocated in said cylinder whereby on movement of said piston to expel fluid from said cylinder the fluid under pressure in said cylinder effects an application of oppositely directed forces to said side gears which move said side gears into frictional engagement with said case.

References Cited in the file of this patent

UNITED STATES PATENTS

| | | |
|---|---|---|
| 2,722,140 | Cabell | Nov. 1, 1955 |
| 3,109,323 | Saurer | Nov. 5, 1963 |

FOREIGN PATENTS

| | | |
|---|---|---|
| 499,048 | Great Britain | Jan. 18, 1939 |